June 24, 1952 J. J. Z. VAN ZELST 2,601,474

BRIDGE-TYPE TRANSDUCER CIRCUIT WITH OSCILLATOR

Filed Jan. 5, 1950

INVENTOR.

JOHANNES JACOBUS ZAALBERG VAN ZELST

BY Fred M Vogel

AGENT

Patented June 24, 1952 2,601,474

UNITED STATES PATENT OFFICE 2,601,474

BRIDGE-TYPE TRANSDUCER CIRCUIT WITH OSCILLATOR

Johannes Jacobus Zaalberg van Zelst, Eindhoven, Netherlands, assignor to Hartford National Bank and Trust Company, Hartford, Conn., as trustee Application January 5, 1950, Serial No. 136,875
In the Netherlands January 12, 1949

6 Claims. (Cl. 179—100.1)

This invention relates to circuit-arrangements for taking an electrical alternating voltage from a variable reactance, more particularly from a condenser microphone. The circuit arrangement comprises a bridge network, one branch of which includes the variable reactance, an auxiliary oscillation generator feeding the bridge, and a detector by means of which the oscillation across the balance branch of the bridge network (bridge oscillation) is detected, if necessary after amplification.

A known circuit-arrangement of this kind comprises a bridge network, in which a "test" branch is constituted by a series combination of the condenser microphone and an inductance, the series combination being tuned substantially to the frequency of the auxiliary oscillation, and a comparison branch comprising an impedance (comparison impedance) having amplitude and phase characteristics substantially identical with the "test" branch in the frequency region of the auxiliary oscillation. This test branch is constituted by the series-combination of an inductance and a capacity which are substantially of equal reactance values. Such an amplifier exhibits a very low interference level, since the impedance of the said series-combinations is very low, so that inter alia the influence of variations in the supply conductor between the condenser microphone and the amplifier becomes substantially negligible, as is also the case with respect to small variations in the frequency or amplitude of the auxiliary oscillation because of the balancing effect of the bridge.

The principal object of the present invention is to provide a circuit arrangement of the above type in which a wider frequency range of the oscillation derived from the condenser microphone may be amplified.

Another object of the invention is to provide a circuit arrangement of the above type in which small variations in the values of the circuit elements have substantially no effect on the detected oscillation.

Further objects of the invention will appear from the following description.

According to the invention the comparison impedance comprises at least one parallel resistance of the same order of magnitude as the loss resistance of the said series circuit.

Figure 1:
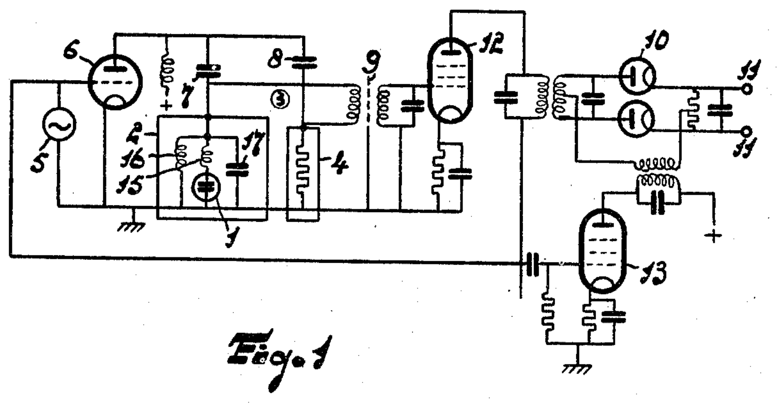
Figures 2, 3:
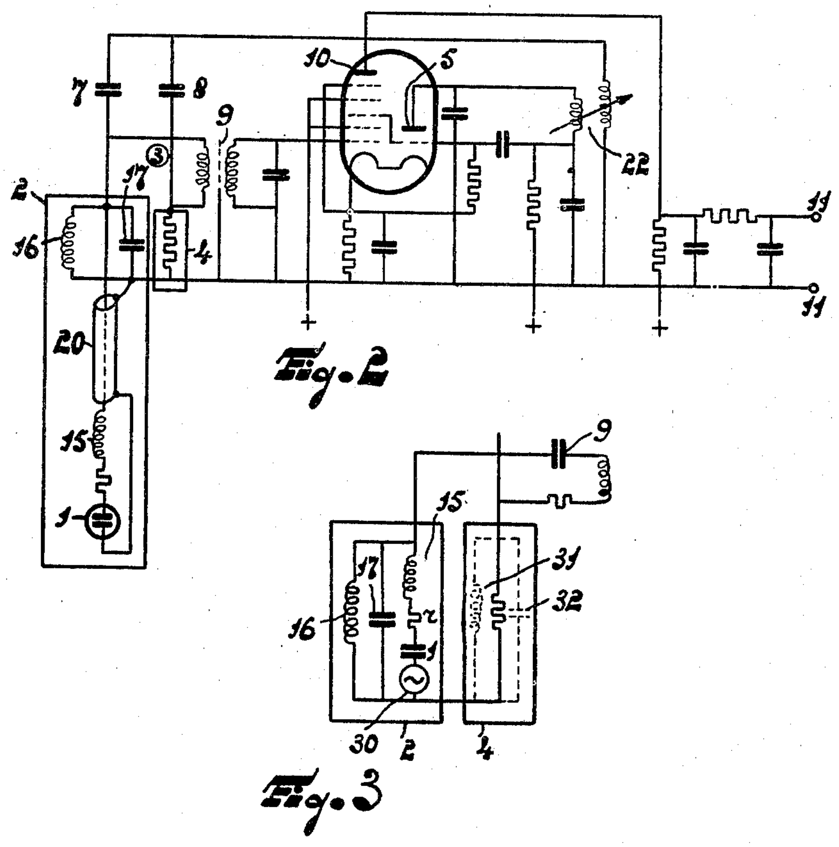

In order that the invention may be readily carried into effect, two examples will now be described in detail with reference to the accompanying drawing in which:

Fig. 1 is a schematic circuit-diagram of a circuit arrangement for a condenser microphone, Fig. 2 shows a modification of the circuit arrangement of Fig. 1, and Fig. 3 is an explanatory diagram showing a part of the circuit-arrangement of Fig. 2.

In the circuit-arrangement of Fig. 1, the impedance of a variable reactance, in this example a condenser microphone 1, is varied by acoustic oscillations. The condenser microphone 1 is included in a transducer branch 2 of a bridge network 3 comprising a comparison branch 4 and impedances 7 and 8, constituted, for example, by two condensers having, for example, the same values. The bridge 3 is fed by an auxiliary oscillation generator 5. The oscillations from generator 5 are amplified by means of an amplifier 6 and then supplied to a condenser 7 and the bridge branch 2 and to the condenser 8 and the bridge branch 4. Thus, a modulated electrical oscillation may be taken from the circuit of the variable reactance 1.

The difference between the oscillations produced at the branches 2 and 4 (bridge oscillation) is then supplied through a step-up circuit 9, tuned to the auxiliary frequency and an amplifier 12 to a detector, which in this example is a push-pull detector 10. This detector has furthermore supplied to it in phase coincidence an auxiliary oscillation amplified by means of an amplifier, the amplified microphone oscillation being taken from output terminals 11.

As described so far, the circuit-arrangement is a known one and its operation is as follows:

The oscillations produced across the two branches 2 and 4 of the bridge are substantially equal for the rest position of the microphone 1. Upon variation in the impedance of the microphone 1, the oscillation produced across the branch 2 will be modulated, primarily in phase, so that the difference between this oscillation and the oscillation produced across branch 4, i. e. the bridge oscillation, has the characteristic of a phase-modulated oscillation, the carrier wave of which is absent. It may, therefore, also be regarded as an amplitude-modulated oscillation without carrier wave. This bridge oscillation is derived from the brigde by means of the transformer 9 and is applied to the control grid of the amplifier tube 12. The output circuit of amplifier tube 12 is coupled to the push pull detector circuit 10 so that the bridge oscillation is applied to the anodes of the rectifiers of detector 10 in push pull relationship. The auxiliary oscillation from oscillator 5 is applied to the control grid of amplifier tube 13, the output circuit of which is coupled to the push pull detector stage 10. The amplified auxiliary oscillation is applied to the rectifiers of detector stage 10 in such a phase that the auxiliary oscillation and the bridge oscillation are mixed, a detected output signal corresponding to the microphone oscillation being developed across the output terminals 11.

The circuit-arrangements according to the invention differ from known circuit-arrangements in that the bridge branch 4 includes a resistance of the same order of magnitude as the loss resistance of the branch 2. In particular the circuit-arrangement of Fig. 1 differs from known arrangements in that this bridge branch 4 is a resistance. In that case it is required that the other branch of the bridge should present solely a resistive impedance at the frequency of the auxiliary oscillations in order that this branch should have, in the proximity of the auxiliary frequency, a horizontal phase characteristic curve as a function of frequency with a phase equal to zero. For this purpose a parallel tuned circuit, comprising an inductance 16 and a condenser 17, is connected in parallel with the series tuned circuit comprising an inductance coil 15 and the condenser microphone 1. Each of these tuned circuits are tuned to the auxiliary frequency.

The desired horizontal phase characteristic curve is obtained, if between the inductances 15, 16 and the condensers 1, 17 the relations $r^2C_{17}=L_{15}$ and $L_{16}=r^2C_1$ apply. In these equations $r$ designates the loss resistance of the series-circuit 1, 15 and the inductive and capacitive reactances of the further circuit elements are designated by the usual references L and C, respectively.

The measure described ensures that occasional amplitude and frequency variations of the auxiliary oscillation produced by noise or other interferences are without effect on the amplified microphone oscillation, since the amplitude and the phase of the oscillations produced across the branees 2 and 4 invariably remain indentical in spite of such variations. In addition, substantially no interference is introduced owing to variations in the circuit elements, since the resistance in the branch 4 has a low value, while a small variation in the circuit elements 16 and 17 leads to substantially the same amplitude and phase characteristic curves of the bridge branch 2. If, furthermore, the condenser microphone 1 is connected through a cable to the amplifier, this cable being terminated at its beginning and at its end by its surge impedance, interfering oscillations introduced into this cable from the surroundings, for example power-line hum, will only have a very small effect on the amplified oscillations as a result of the low impedance of the bridge branch 2, and more particularly of the parallel circuit 16, 17 for the frequency of this hum.

Further suppression of this hum may be obtained by extending the network 16, 17 to form a band-pass filter, for example a filter of the $\pi$ type, in which the two parallel branches include parallel circuits tuned to the auxiliary frequency and the series branch includes a series circuit tuned to the auxiliary frequency.

If the condensers 7 and 8 are of equal values, the resistance of the bridge branch 4 will require the same value as the loss resistance $r$ of the series combination 1, 15 of the circuit in the bridge branch 2. If the condensers are made of different values, the resistance of the branch will require a corresponding variation.

Fig. 2 shows a circuit-arrangement in which the condenser microphone 1 is connected through a cable 20 to the amplifying circuit. The latter comprises, for example, a triode tube 5 for producing the auxiliary oscillation and a hexode or heptode 10 for amplifying and detecting the bridge oscillation; these tubes may be housed in one envelope. The auxiliary oscillation produced by the generator 5 is supplied through the 90° phase-shifting impedances 22, 7 and 8 to the two bridge branches 2 and 4. The oscillation derived from oscillator 5 and applied to the two branches 2 and 4 of the bridge will not, in the rest condition of the condenser microphone, produce an output oscillation. When the condenser microphone 1 is subjected to a sound wave, the reactance variations thereof will modulate the auxiliary oscillation in this branch, so that a modulated oscillation will appear across the output of the bridge. This output or bridge oscillation is supplied through the circuit 9, which also produces a phase-shift of 90°, to one control-grid of the mixing detector tube 10, the other control-grid of which has supplied to it the oscillation of the generator 5. Thus, the amplified oscillation is produced by multiplicative mixing in the output circuit of the mixing detector 10 and supplied to output terminals 11.

The circuit arrangement above described provides important advantages. In particular, the band width is substantially increased with respect to the band width of known circuit arrangements, while the sensitivity of the arrangement according to the invention is at least equal to that of the known arrangements. That this is the case may readily be seen from the following analysis.

If the loss resistance $r$ of the branch 2 is negligible relative to the impedance of condenser 7, as shown in Fig. 3, the variable reactance 1 may substantially be regarded as a voltage source 30, which is operative in the closed circuit comprising the branches 2, 4 and the circuit 9. The frequency spectrum of voltage source 30 then corresponds to the side-band spectrum of the phase-modulated oscillation produced across the branch 2. The measure of stepping-up of the voltage across the circuit 9 is determined by the impedance of the inductance $L_9$ of this circuit, divided by the total resistance $r+r_4+r_9$ of the circuit, while the bandwidth is inversely proportional to the quotient of the sum of the inductances $L_2+L_4+L_9$ of the branches 2, 4 and 9, and the total resistance of the circuit. Compared with the known arrangement, in which the branch 4 is constituted by a tuned series circuit, an improvement of a factor of 3 is obtained with the same values of inductances in the branches 2, 4 and 9, since the inductances of the branches 2 and 4 are zero. If, furthermore, a circuit tuned to the auxiliary frequency is connected in parallel with the resistance 4, in which event the circuit 16, 17 again must be so proportioned that the phase characteristic curves of the branches 2 and 4 coincide, a further apparent reduction of the total inductance of the circuit is obtainable. The slope of the phase characteristic curve of the impedance constituted by the series-connection of the branches 2 and 4 then approaches, measured in absolute value, more and more that of the circuit 9, but always remains smaller than the latter.

What I claim is:

1. A transducer circuit arrangement, comprising a source of auxiliary oscillations having a given frequency, a bridge circuit having input and output portions and comprising a transducer branch and a comparison branch, said transducer branch comprising a series resonant circuit having a given loss resistance value and including a variable reactance element and being tuned substantially to said given frequency, said transducer branch having given amplitude and phase characteristics at frequencies in proximity to said given frequency, said comparison branch comprising a resistance element having a resistance value of the same order of magnitude as said given loss resistance value and having amplitude and phase characteristics in proximity to said given frequency substantially similar to said given amplitude and phase characteristics, means to apply said auxiliary oscillations to the input of said bridge circuit, means to vary the reactance of said variable reactance element to produce thereby a modulated oscillation at the output of said bridge circuit, and means coupled to said bridge circuit to detect said modulated oscillation.

2. A transducer circuit arrangement, comprising a source of auxiliary oscillations having a given frequency, a bridge circuit having input and output portions and comprising a transducer branch and a comparison branch, said transducer branch comprising a series resonant circuit having a given loss resistance value and including a variable reactance element and being tuned substantially to said given frequency and a parallel resonant circuit coupled in parallel with said series resonant circuit and being tuned substantially to said given frequency, said transducer branch having given amplitude and phase characteristics at frequencies in proximity to said given frequency, said comparison branch comprising a resistance element having a resistance value of the same order of magnitude as said given loss resistance value and having amplitude and phase characteristics in proximity to said given frequency substantially similar to said given amplitude and phase characteristics, means to apply said auxiliary oscillations to the input of said bridge circuit, means to vary the reactance of said variable reactance element to produce thereby a modulated oscillation at the output of said bridge circuit, and means coupled to said bridge circuit to detect said modulated oscillation.

3. A transducer circuit arrangement, comprising a source of auxiliary oscillations having a given frequency, a bridge circuit having input and output portions and comprising a transducer branch and a comparison branch, said transducer branch comprising a series resonant circuit having a given loss resistance value and including a condenser microphone and a first inductive reactance element and being tuned substantially to said given frequency and a parallel resonant circuit coupled in parallel with said series resonant circuit and including a first capacitive element and a second inductive element and being tuned substantially to said given frequency, the capacitance value of said first capacitive element being substantially equal to the quotient of the inductive value of said first inductive element and the square of said given loss resistance value, said transducer branch having given amplitude and phase characteristics at frequencies in proximity to said given frequency, said comparison branch comprising a resistance element having resistance value of the same order of magnitude as said given loss resistance value and having amplitude and phase characteristics in proximity to said given frequency substantially similar to said given amplitude and phase characteristics, means to apply said auxiliary oscillations to the input of said bridge circuit, means to vary the reactance of said condenser microphone to produce thereby a modulated oscillation at the output of said bridge circuit, and means coupled to said bridge circuit to detect said modulated oscillation.

4. A transducer circuit arrangement, comprising a source of auxiliary oscillations having a given frequency, a bridge circuit having input and output portions and comprising in series circuit arrangement a transducer branch and a comparison branch, said transducer branch comprising a series resonant circuit having a given loss resistance value and including a condenser microphone and an inductive element and being tuned substantially to said given frequency and a first parallel resonant circuit coupled in parallel with said series resonant circuit and being tuned substantially to said given frequency, said transducer branch having given amplitude and phase characteristics at frequencies in proximity to said given frequency, said comparison branch comprising a resistance element having a resistance value of the same order of magnitude as said given loss resistance value and a second parallel resonant circuit coupled in parallel with said resistance element and being tuned substantially to said given frequency, said comparison branch having amplitude and phase characteristics in proximity to said given frequency substantially similar to said given amplitude and phase characteristics, means to apply said auxiliary oscillations to the input of said bridge circuit, means to vary the reactance of said condenser microphone to produce thereby a modulated oscillation at the output of said bridge circuit, a voltage step-up circuit coupled to the output portion of said bridge circuit and having a phase characteristic curve with a predetermined slope, and means coupled to said voltage step-up circuit to detect said modulated oscillation, the series circuit arrangement of said transducer branch and said comparison branch having a phase characteristic curve with a slope less than said predetermined slope.

5. A transducer circuit arrangement, comprising a source of auxiliary oscillations having a given frequency, a bridge circuit having input and output portions and comprising a transducer branch and a comparison branch, said transducer branch comprising a series resonant circuit having a given loss resistance value and including a variable reactance element and being tuned substantially to said given frequency, said transducer branch having given amplitude and phase characteristics at frequencies in proximity to said given frequency, said comparison branch comprising a resistance element having a resistance value of the same order of magnitude as said given loss resistance value and having amplitude and phase characteristics in proximity to said given frequency substantially similar to said given amplitude and phase characteristics, means to apply said auxiliary oscillations to the input of said bridge circuit, means to vary the reactance of said variable reactance element to produce thereby a modulated oscillation at the output of said bridge circuit, a mixing detector comprising an electron discharge tube having input and output circuits, means to apply said modulated oscillation and said auxiliary oscillations to the input circuit of said discharge tube, and means coupled to the output circuit of said discharge tube to derive therefrom a demodulated oscillation.

6. A transducer circuit arrangement, comprising a source of auxiliary oscillations having a given frequency, a bridge circuit having input and output portions and comprising a transducer branch and a comparison branch, said transducer branch comprising a series resonant circuit having a given loss resistance value and including a condenser microphone and an inductive element and being tuned substantially to said given frequency and a first parallel resonant circuit coupled in parallel with said series resonant circuit and being tuned substantially to said given frequency, said transducer branch having given amplitude and phase characteristics at frequencies in proximity to said given frequency, said comparison branch comprising a resistance element having a resistance value of the same order of magnitude as said given loss resistance value and a second parallel resonant circuit coupled in parallel with said resistance element and being tuned substantially to said given frequency, said comparison branch having amplitude and phase characteristics in proximity to said given frequency substantially similar to said given amplitude and phase characteristics, means to apply said auxiliary oscillations to the input of said bridge circuit, means to vary the reactance of said condenser microphone to produce thereby a modulated oscillation at the output of said bridge circuit, a mixing detector comprising an electron discharge tube having an input circuit and an output circuit, means to apply said modulated oscillation and said auxiliary oscillations to the input circuit of said discharge tube, and means coupled to the output of said discharge tube to derive therefrom a demodulated oscillation.

JOHANNES JACOBUS ZAALBERG VAN ZELST.

REFERENCES CITED

The following references are of record in the file of this patent:

UNITED STATES PATENTS

| Number | Name | Date |
|---|---|---|
| 1,732,393 | Andrews | Oct. 22, 1929 |
| 2,211,101 | Hallmark | Aug. 13, 1940 |
| 2,357,026 | Scherbatsky | Aug. 29, 1944 |
| 2,361,658 | Sinnett | Oct. 31, 1944 |
| 2,391,532 | Wilmotte | Dec. 25, 1945 |
| 2,488,927 | Owen | Nov. 22, 1949 |